United States Patent Office 2,876,335
Patented Mar. 3, 1959

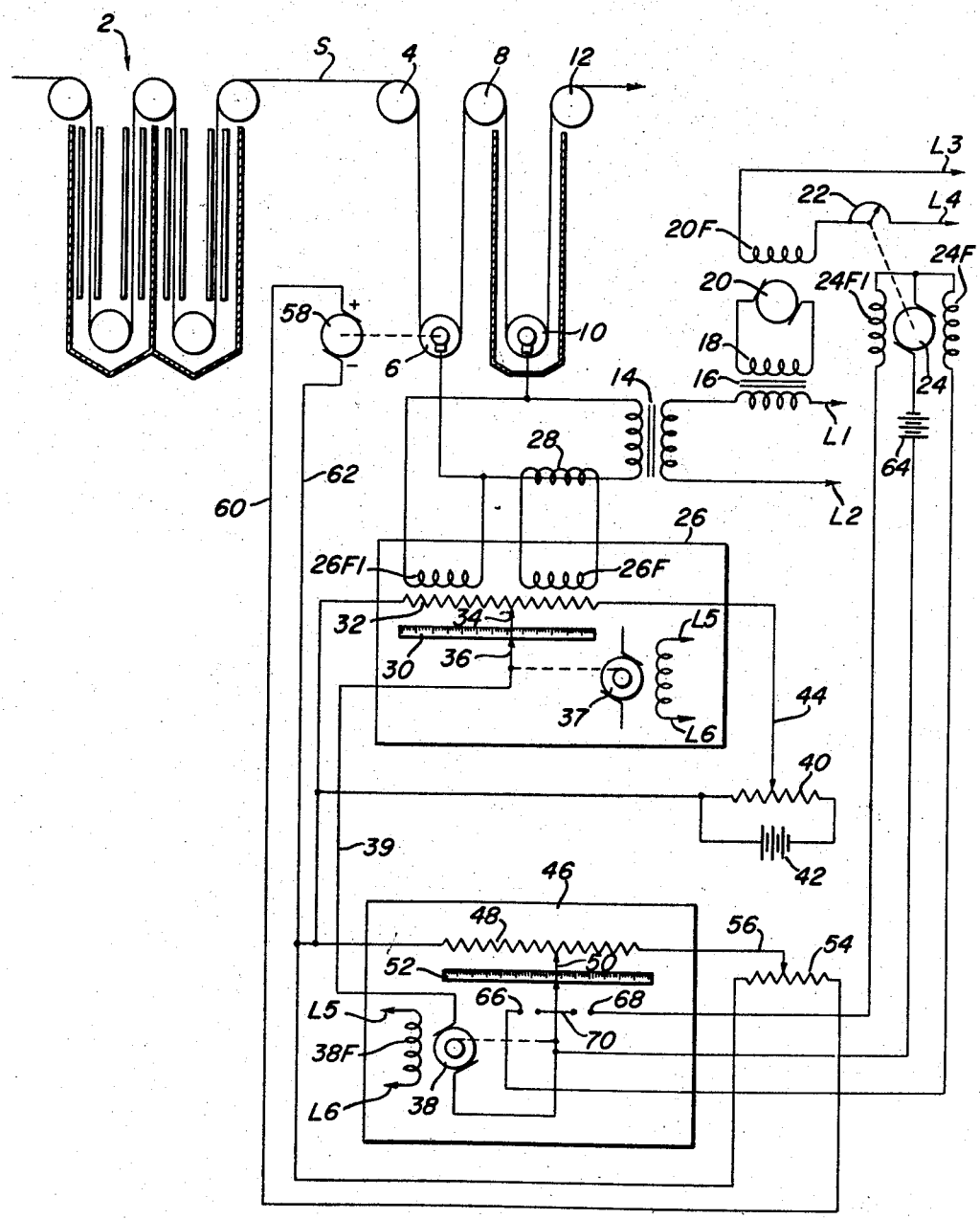

2,876,335
APPARATUS FOR INDICATING AND CONTROLLING THE HEATING OF A TRAVELLING STRIP

George H. Rendel, Pittsburgh, Pa., assignor to United States Steel Corporation, a corporation of New Jersey Application November 15, 1956, Serial No. 622,353

6 Claims. (Cl. 219—155)

This invention relates to apparatus for indicating and controlling the rate of heating of a metal strip and more particularly to the controlling of the melting of a tin coated steel strip in an electrolytic tinning line. After the tin coating is applied to the strip the strip is frequently heated to melt the tin and cause it to reflow. This is done to improve the properties of the tinplate. The heating of the strip is most often accomplished by passing a high amperage current through it as it travels through a melting zone. Apparatus for controlling the power input to a melting zone is disclosed in my prior Patent No. 2,432,801, dated December 16, 1947, and in Holman et al. Patent No. 2,419,214, dated April 22, 1947. Heating the strip to melt the tin causes fusion of the tin and steel at the interface and results in the development of a tin-iron alloy layer between the steel and tin. The tin coating is thin and the tin-iron alloy layer developed in the metal coating process often is thick enough to adversely affect soldering of the tinplate after it has been formed into containers. I have found that satisfactory low tin-iron alloy layers can be maintained on electrolytic tin products when the melted coating power input or heating rate is regulated at a value only slightly greater than that required to produce tinplate having a bright lustre and a smooth finish. Prior to my invention the heating rate for melting the tin coating was maintained so as to produce a bright lustre on the tinplate without any visible evidence of overheating. In order to assure that the tin would be of sufficient temperature for this purpose it was common practice to heat the strip and tin to a temperature above 500°. I have found that this practice resulted in a product having suitable lustre but having a tin-iron alloy layer which greatly exceeded that suitable for soldering purposes. With the apparatus in use prior to my invention there was no indication of the rate of heating of the travelling strip and hence the operator could not readily determine the temperature of the strip. I have also found that the heating rate may be used as a means of indicating the approximate tin-iron alloy layer thickness.

It is therefore an object of my invention to provide apparatus for indicating and controlling the rate of heating of a travelling strip, particularly the heating of an electrolytic tin strip for the purpose of melting the tin and reflowing it on the strip.

This and other objects will be more apparent after referring to the following specification and attached drawing, in which:

The single figure is a schematic view of part of an electrolytic tinning line and a control and indicator for the melted coating portion of the line.

Referring more particularly to the drawing, the reference numeral 2 indicates the coating portion of an electrolytic tinning line through which a steel strip S passes. From this portion of the line the strip S passes over rolls 4, 6, 8, 10 and 12. The rolls 6 and 10 are conductor rolls and alternating current from a transformer 14 is supplied thereto so that the current flows through that portion of the strip between rolls 6 and 10, thus causing it to heat up and melt the tin coating so that it will reflow and improve the coating. The power input to the melting zone, that is, the zone between rolls 6 and 10, is regulated by a saturable core reactor 16. Power is supplied to the primary of transformer 14 from power lines L1 and L2. The reactance in reactor 16 is controlled by its exciting winding 18 which is energized from a generator 20 having a field winding 20F. Excitation for the field winding 20F is received from power source L3—L4. A rheostat 22 is used to control the electrical strength of field winding 20F. Rheostat 22 may be manually operated, but is preferably operated by a reversible motor 24. Thus, it is seen that the power input to the melting zone may be regulated by adjusting rheostat 22. A thermal energy converter 26 has one winding 26F connected to a current transformer 28 in the line leading to the conductor roll 6 and a second winding 26F1 connected to the lines leading to conductor rolls 6 and 10 in the usual manner. The converter 26 may be provided with a scale 30 which is calibrated in terms of the total power being supplied to the rolls 6 and 10. A watt meter may be used as the converter 26. A self-balancing potentiometer or voltage divider 32 is associated with the thermal converter 26 and has a pointer or contact arm 34 which moves with pointer 36 associated with the scale 30. Pointers 34 and 36 are moved by means of motor 37 of the self-balancing potentiometer 32. A reversible motor 38 is electrically connected to the pointers 34 and 36 by means of lead 39. A second potentiometer 40 is connected in series with the potentiometer 32 and with a battery 42, pointer 44 of potentiometer 40 being connected to the resistance of potentiometer 32. Motor 38 is part of a self-balancing potentiometer or voltage divider 46 having a resistance 48 and a pointer 50 mechanically connected to the motor 38. A scale 52 which is calibrated to indicate units of heat per pound of steel being heated also has the pointer 50 associated therewith. Motor 38 is excited by its field winding 38F which is connected to power source L5—L6. A potentiometer 54 having a pointer 56 is connected in series with resistance 48. A tachometer generator 58 is mechanically connected to conductor rolls 6 so that it is driven at a speed proportional to strip speed. The generator 58 is connected in series with potentiometer 54 through leads 60 and 62. Lead 62 is also connected to one side of the resistance of potentiometer 32. When it is desired to control the power input automatically a circuit is provided for controlling the operation of motor 24. This circuit includes field windings 24F and 24F1 and battery 64. Field winding 24F is connected to a stationary contact 66 and field winding 24F1 to a stationary contact 68. A contact 70 is mounted on pointer 50 for movement therewith.

The operation and calibration of my device is as follows. The heating rate in watt hours per pound of steel equals $$\frac{WH}{W \times T \times S \times K}$$

where WH is the power input to the melting zone in watt hours, W is strip width in inches, T is total thickness of the strip in inches, S is the strip speed in feet per minute and K is a constant equivalent to 203.76. K is obtained by multiplying 60 by 12 by .283, this last being the weight of one cubic inch of steel. Assuming that battery 42 is rated at 20 volts, that scale 30 is graduated from zero to 2000 kilowatts, that the output of tachometer generator 58 is 10 volts at 1000 feet per minute strip speed, that scale 52 is graduated from zero to 200 watt hours per pound, that potentiometer 40 is graduated from zero to 38 inches strip width, that potentiometer 54 is graduated from .00645 to .01935 inch of strip thickness, that the strip speed is 1000 feet per minute, that the strip width is 38 inches, that the strip thickness is .0129 inch and that the desired heating rate to obtain the desired temperature in the strip of tin coating is 20 watt hours per pound, the total power input will equal the watt hours per pound times the total weight passing through the heating zone in an hour. The total weight equals 1000×38×.0129×203.76 or 100,000 pounds. The power input therefore will be $$\frac{100,000 \times 20}{1000}$$

or 2000 kilowatts. The rheostat 22 is adjusted to supply that amount of power to the conductor rolls 6 and 10. The voltage between lines 39 and 62 will be proportional to the total power being supplied to the conductor rolls and will also equal the voltage across line 62 and pointer 50. The voltage between lines 39 and 62 is modified by adjusting potentiometer 40 to the point corresponding to 38 inch width and the voltage across pointer 50 and line 62 is modified by adjusting the potentiometer 54 to correspond to .0129 inch thickness. I have found that the temperature of the melted tin must be maintained between 470° and 490° F. to obtain the desired lustre without increasing the tin-iron alloy layer to a point where it is unsuitable for soldering. It is assumed for the purpose of illustration that 20 watts per pound of strip will maintain the strip between these temperatures at all times. When the potential between leads 39 and 62 is different than the potential between pointer 50 and lead 62 motor 38 will operate to move pointer 50 until these two voltages balance. The pointer 50 will then indicate a different heating rate and if the control is not automatic the rheostat 22 will be adjusted manually until the pointer 50 returns to its desired position. If the pointer 50 moves to the left it will indicate a lower heating rate than that desired. When using the automatic control shown this will cause contact 70 to complete a circuit to field 24F through contact 66, thus causing motor 24 to rotate in a direction to move rheostat 22 to increase the power input to conductor rolls 6 and 10 until the pointer 50 moves back to its original position. In case the heating rate is too great contact 70 will complete a circuit to field 24F1 through contact 68, thus causing motor 24 to operate in the opposite direction to decrease the power input to conductor rolls 6 and 10.

While one embodiment of my invention has been shown and described it will be apparent that other adaptations and modifications may be made without departing from the scope of the following claims.

I claim:

1. Apparatus for indicating and controlling the rate of heating of a travelling strip comprising a first means for applying current to the strip, a rheostat for varying the amount of current supplied to said strip, a motor for adjusting said rheostat, a voltage divider, a second means for applying a voltage proportional to total heating power to said voltage divider, a third means for applying a voltage proportional to strip speed to said voltage divider, a fourth means for modifying the voltage applied to one of the second and third means dependent upon strip thickness, a fifth means for modifying the voltage applied to one of the second and third means dependent upon strip width, an indicator associated with said voltage divider for indicating the rate of heating applied to strip, and means operable by said voltage divider for energizing said motor when the voltage applied to said voltage divider is out of balance to move said rheostat to vary the total current supplied to the strip.

2. Apparatus for indicating the rate of heating of a travelling strip comprising a first means for applying current to the strip, a voltage divider, a second means for applying a voltage proportional to total heating power to said voltage divider, a third means for applying a voltage proportional to strip speed to said voltage divider, a fourth means for modifying the voltage applied to one of the second and third means dependent upon strip thickness, a fifth means for modifying the voltage applied to one of the second and third means dependent upon strip width, and an indicator associated with said voltage divider for indicating the rate of heating applied to the strip.

3. Apparatus for controlling the rate of heating of a travelling strip comprising a first means for applying current to the strip, a control for varying the amount of current supplied to said strip, a voltage divider, a second means for applying a voltage proportional to the total heating power to said voltage divider, a third means for applying a voltage proportional to strip speed to said voltage divider, a fourth means for modifying the voltage applied to one of the second and third means dependent upon strip thickness, a fifth means for modifying the voltage applied to one of the second and third means dependent upon strip width, and means operable by said voltage divider for actuating said control when the voltage applied to said voltage divider is out of balance to vary the total current supplied to the strip.

4. Apparatus for indicating and controlling the rate of heating of a travelling strip comprising a first means for applying current to the strip, a rheostat for varying the amount of current supplied to said strip, a motor for adjusting said rheostat, a second means including a potentiometer for obtaining a voltage proportional to total heating power, a first D. C. power source in series with said potentiometer, a second potentiometer in series with said first D. C. power source, a reversible motor electrically connected to the pointer of said first potentiometer, a third potentiometer having its pointer connected to be moved by said last named motor, a tachometer generator connected to be driven at a speed proportional to strip speed and connected in series with said third potentiometer, a fourth potentiometer connected in series with said third potentiometer, one of said second and fourth potentiometers being adjustable in accordance with strip thickness and the other in accordance with strip width, an indicator associated with said third potentiometer for indicating the rate of heating applied to the strip, and a control circuit for said first motor, said control circuit including a pair of fields, a battery, a pair of contacts and a contact associated with the pointer of said third potentiometer, said last named contact contacting one of said pair of contacts when the rate of heating varies from a predetermined amount to operate said first motor to move said rheostat to vary the total current supplied to the strip.

5. Apparatus for indicating the rate of heating of a travelling strip comprising a first means for applying current to the strip, a second means including a potentiometer for obtaining a voltage proportional to total heating power, a first D. C. power source in series with said potentiometer, a second potentiometer in series with said first D. C. power source, a reversible motor electrically connected to the pointer of said first potentiometer, a third potentiometer having its pointer connected to be moved by said last named motor, a tachometer generator connected to be driven at a speed proportional to strip speed and connected in series with said third potentiometer, a fourth potentiometer connected in series with said third potentiometer, one of said second and fourth potentiometers being adjustable in accordance with strip thickness and the other in accordance with strip width, and an indicator associated with said third potentiometer for indicating the rate of heating applied to the strip.

6. Apparatus for controlling the rate of heating of a travelling strip comprising a first means for applying current to the strip, a rheostat for varying the amount of current supplied to said strip, a motor for adjusting said rheostat, a second means including a potentiometer for obtaining a voltage proportional to total heating power, a first D. C. power source in series with said potentiometer, a second potentiometer in series with said first D. C. power source, a reversible motor electrically connected to the pointer of said first potentiometer, a third potentiometer having its pointer connected to be moved by said last named motor, a tachometer generator connected to be driven at a speed proportional to strip speed and connected in series with said third potentiometer, a fourth potentiometer connected in series with said third potentiometer, one of said second and fourth potentiometers being adjustable in accordance with strip thickness and the other in accordance with strip width, and a control circuit for said first motor, said control circuit including a pair of fields, a battery, a pair of contacts and a contact associated with the pointer of said third potentiometer, said last named contact contacting one of said pair of contacts when the rate of heating varies from a predetermined amount to operate said first motor to move said rheostat to vary the total current supplied to the strip.

References Cited in the file of this patent

UNITED STATES PATENTS

| | | |
|---|---|---|
| 2,325,401 | Hurlston | July 27, 1943 |
| 2,381,323 | Vore | Aug. 7, 1945 |
| 2,418,088 | Nachtman | Mar. 25, 1947 |
| 2,419,214 | Holman et al. | Apr. 22, 1947 |
| 2,436,027 | Vonada et al. | Feb. 17, 1948 |
| 2,716,079 | Wick et al. | Aug. 23, 1955 |